(12) United States Patent
Van Baelen et al.

(10) Patent No.: US 9,606,299 B2
(45) Date of Patent: Mar. 28, 2017

(54) FIBER OPTIC CONNECTION SYSTEM

(71) Applicant: TYCO ELECTRONICS RAYCHEM BVBA, Kessel-Lo (BE)

(72) Inventors: David Jan Irma Van Baelen, Winksele (BE); Sabrina Willaert, Sint-Katelijne-Waver (BE); Roel Modest Willy Bryon, Aarschot (BE)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 0 days.

(21) Appl. No.: 14/764,432

(22) PCT Filed: Jan. 29, 2014

(86) PCT No.: PCT/EP2014/051706
§ 371 (c)(1),
(2) Date: Jul. 29, 2015

(87) PCT Pub. No.: WO2014/118221
PCT Pub. Date: Aug. 7, 2014

(65) Prior Publication Data
US 2015/0362678 A1 Dec. 17, 2015

Related U.S. Application Data

(60) Provisional application No. 61/758,051, filed on Jan. 29, 2013, provisional application No. 61/758,180, filed on Jan. 29, 2013.

(51) Int. Cl.
*G02B 6/38* (2006.01)
(52) U.S. Cl.
CPC ......... *G02B 6/3825* (2013.01); *G02B 6/3879* (2013.01); *G02B 6/3893* (2013.01); *G02B 6/3897* (2013.01)

(58) Field of Classification Search
None
See application file for complete search history.

(56) References Cited

U.S. PATENT DOCUMENTS 5,588,079 A * 12/1996 Tanabe ................ G02B 6/3831
385/78
5,838,856 A * 11/1998 Lee ...................... G02B 6/3821
385/136

(Continued)

FOREIGN PATENT DOCUMENTS

WO  WO 2009/023673   2/2009
WO  WO 2013/117598   8/2013

OTHER PUBLICATIONS

International Search Report for International Application No. PCT/EP2014/051706 mailed Mar. 21, 2014 (2 pages).

*Primary Examiner* — Rhonda Peace
(74) *Attorney, Agent, or Firm* — Merchant & Gould P.C.

(57) ABSTRACT

A fiber optic connector (12) is mounted to a fiber optic connector holder (14). The holder (14) can be a separate piece mountable to other devices, such as trays, panels, modules, cassettes, and chassis. Alternatively, the holder (14) can be integrally formed with the device. In some implementations, multiple holders (14) can be provided as separate elements, or as an integral element. The fiber optic connector holder (14) holds the fiber optic connector (12) in position ready for connection to another fiber optic connector (50) at a desired time. The holder (14) receives a fiber optic adapter (36), and a second fiber optic connector (50). The adapter (36) aligns the two connectors (12, 50) for fiber optic signal transmission. The fiber optic connector holder (14) includes a clip (26) for clipping to the first connector (12).

16 Claims, 20 Drawing Sheets

(56) References Cited

U.S. PATENT DOCUMENTS

| | | | | |
|---|---|---|---|---|
| 6,102,581 A * | 8/2000 | Deveau | ............... | G02B 6/266 |
| | | | | 385/139 |
| 6,461,052 B1 * | 10/2002 | Hines | ............... | G02B 6/3887 |
| | | | | 385/135 |
| 6,908,233 B2 * | 6/2005 | Nakajima | ............ | G02B 6/3807 |
| | | | | 385/53 |
| 6,908,234 B2 * | 6/2005 | Kocher | ............... | G02B 6/3875 |
| | | | | 385/55 |
| 7,198,409 B2 * | 4/2007 | Smith | ............... | G02B 6/3849 |
| | | | | 385/53 |
| 7,261,472 B2 * | 8/2007 | Suzuki | ............... | G02B 6/3807 |
| | | | | 385/60 |
| 7,628,637 B2 * | 12/2009 | Kramer | ............... | H01R 13/639 |
| | | | | 439/353 |
| 7,717,625 B2 * | 5/2010 | Margolin | ............. | G02B 6/3825 |
| | | | | 385/100 |
| 2006/0153504 A1 * | 7/2006 | Suzuki | ............... | G02B 6/3807 |
| | | | | 385/71 |
| 2009/0046981 A1 * | 2/2009 | Margolin | ............. | G02B 6/3825 |
| | | | | 385/70 |
| 2015/0362678 A1 * | 12/2015 | Van Baelen | ......... | G02B 6/3893 |
| | | | | 385/56 |
| 2016/0274311 A1 * | 9/2016 | Verheyden | ............ | G02B 6/3825 |

\* cited by examiner

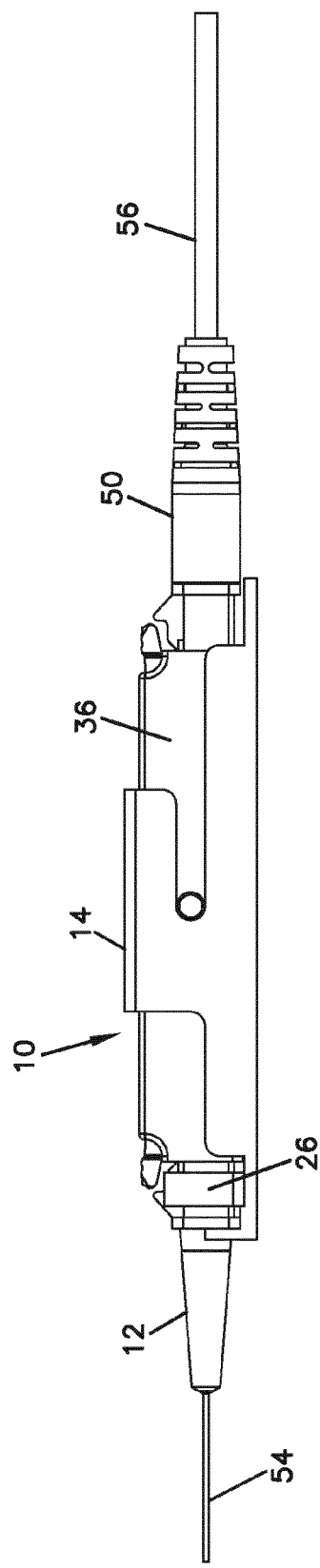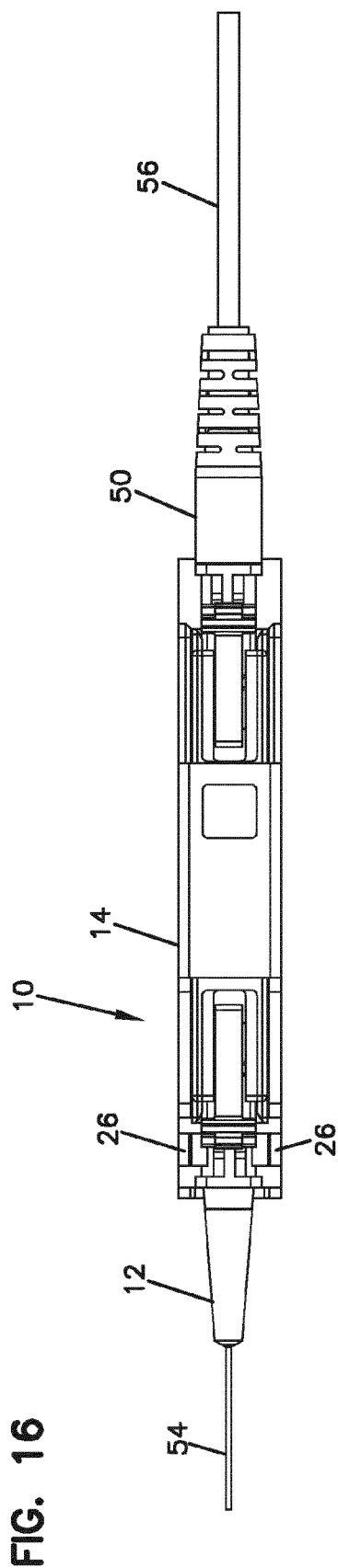

FIBER OPTIC CONNECTION SYSTEM

This application is a National Stage Application of PCT/EP2014/051706, filed 29 Jan. 2014, which claims benefit of U.S. Provisional Ser. No. 61/758,051, filed 29 Jan. 2013 and U.S. Provisional Ser. No. 61/758,180, filed 29 Jan. 2013 and which applications are incorporated herein by reference. To the extent appropriate, a claim of priority is made to each of the above disclosed applications.

BACKGROUND

Fiber optic connectors are known for connecting fiber optic cables to other fiber optic cables or fiber optic equipment. In many situations, a fiber optic adapter is used to align two fiber optic connectors to allow signal transmission between two optical fibers of the cables terminated by the fiber optic connectors.

SUMMARY OF THE INVENTION

In one implementation, a fiber optic connector is mounted to a fiber optic connector holder. The holder can be a separate piece mountable to other devices, such as trays, panels, modules, cassettes, and chassis. Alternatively, the holder can be integrally formed with the device. In some implementations, multiple holders can be provided as separate elements, or as an integral element.

The fiber optic connector holder holds the fiber optic connector in position ready for connection to another fiber optic connector at a desired time. The holder receives a fiber optic adapter, and a second fiber optic connector. The adapter aligns the two connectors for fiber optic signal transmission.

In one example, the fiber optic connector holder includes a clip for clipping to the connector. In some implementations, the clip is releasable.

BRIEF DESCRIPTION OF THE FIGURES

FIG. 15 is a side view of the view of FIG. 13;

FIG. 16 is a top view of the view of FIG. 13;

DETAILED DESCRIPTION

Figure 1:
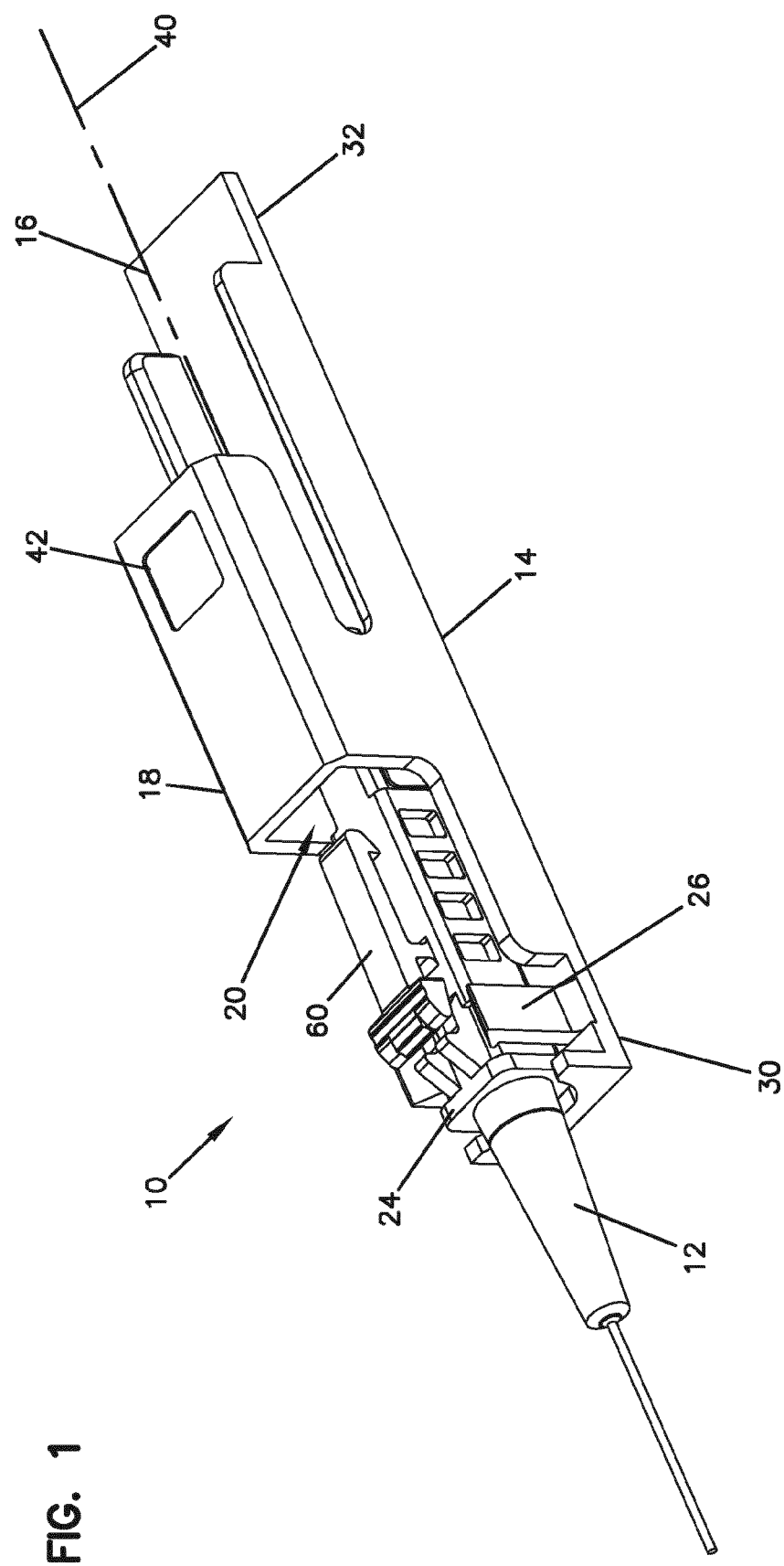
FIG. 1 is a perspective view of a fiber optic connector mounted to a fiber optic connector holder.
Figure 2:
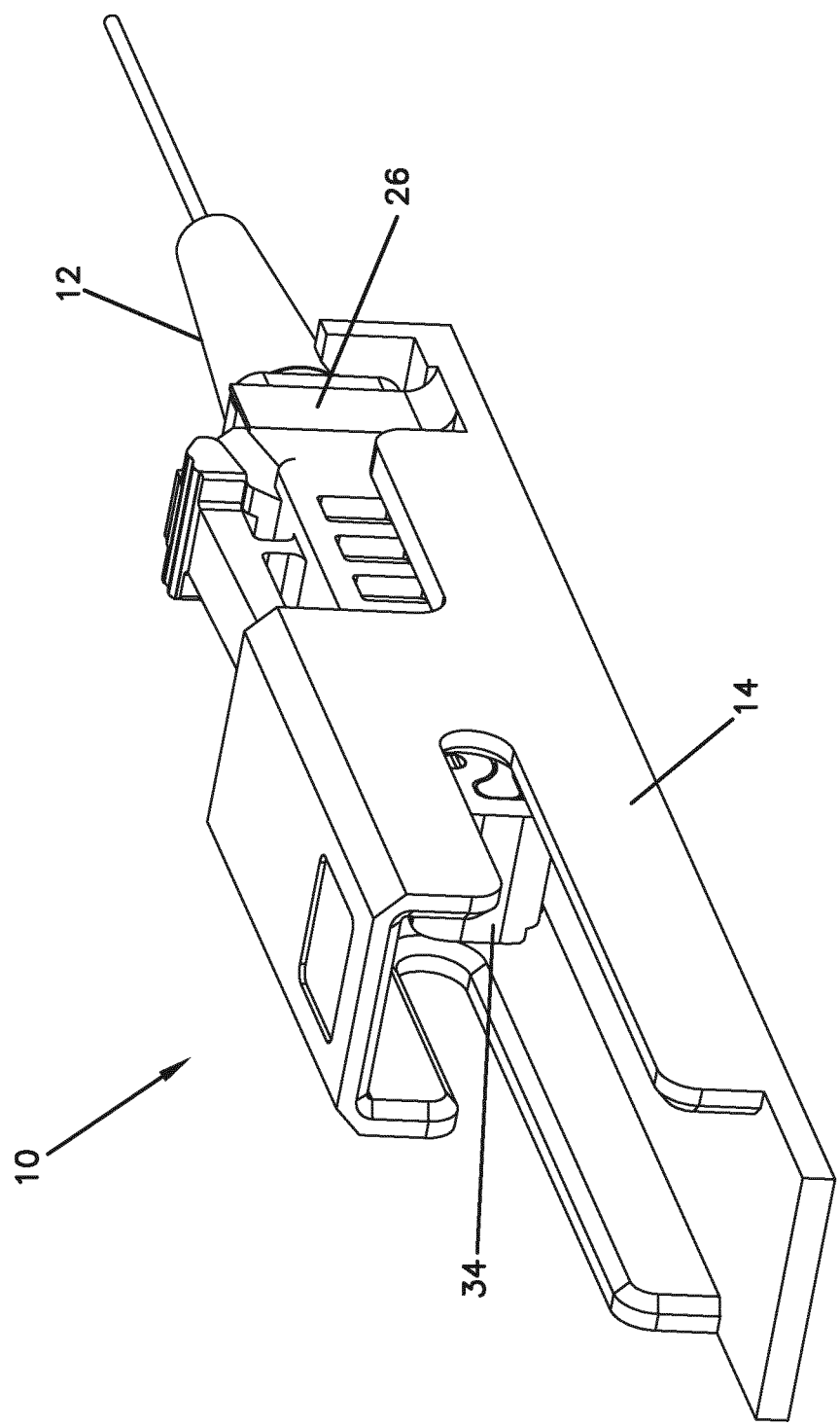
FIG. 2 is a further perspective view of the fiber optic connector and the fiber connector holder of FIG. 1.
Figure 3:
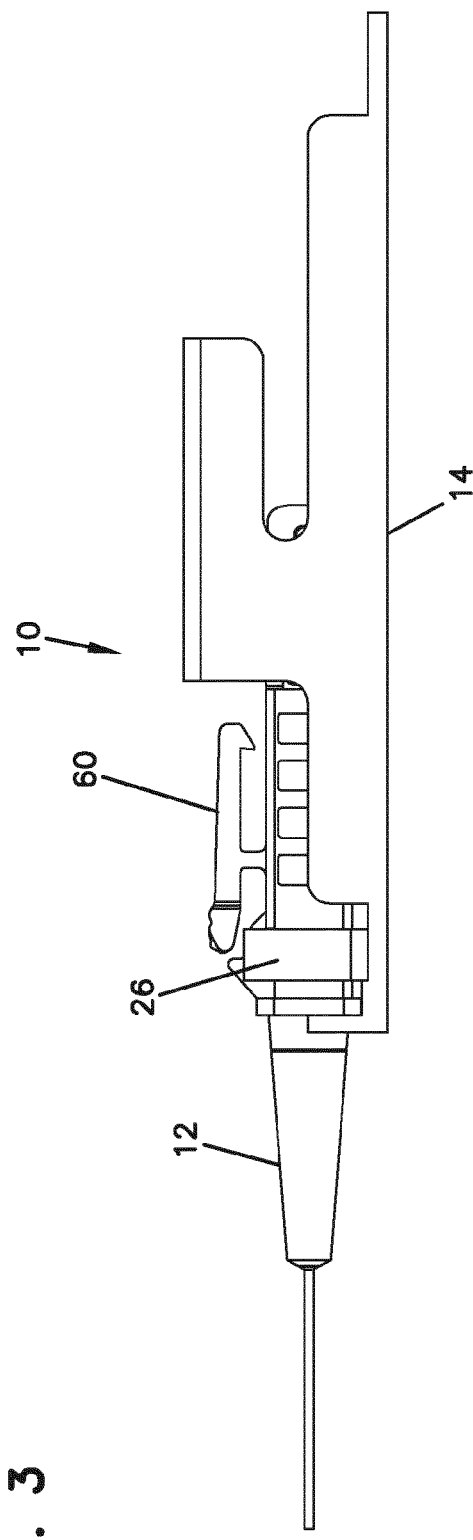
FIG. 3 is a side view of the fiber optic connector and the fiber optic connector holder of FIG. 1.
Figure 4:
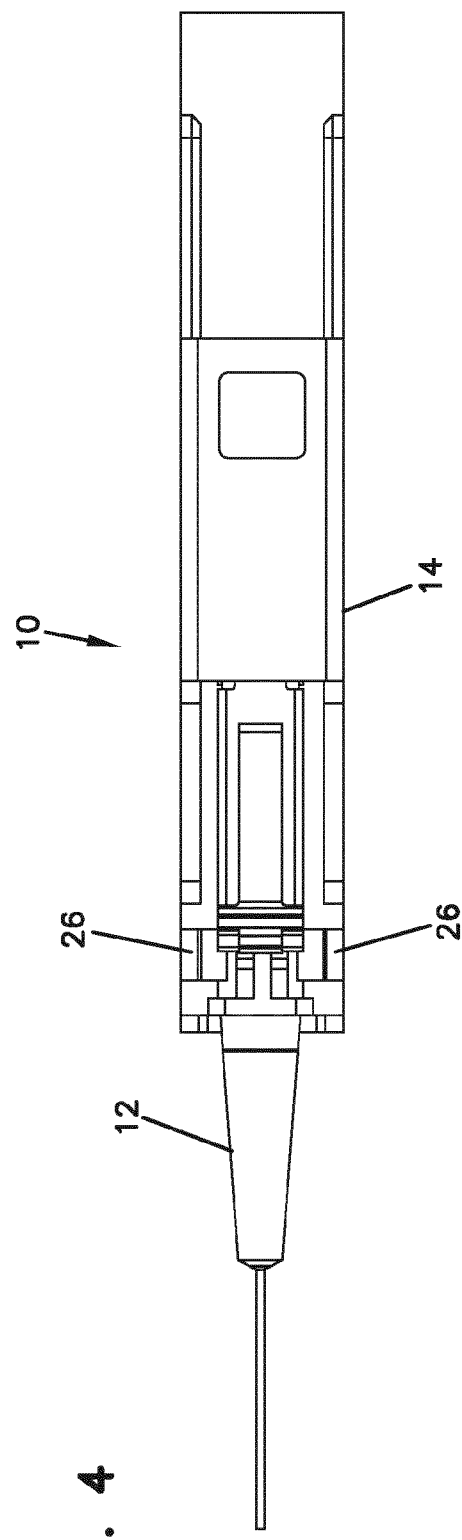
FIG. 4 is a top view of the fiber optic connector and the fiber optic connector holder of FIG. 1.
Figure 5:
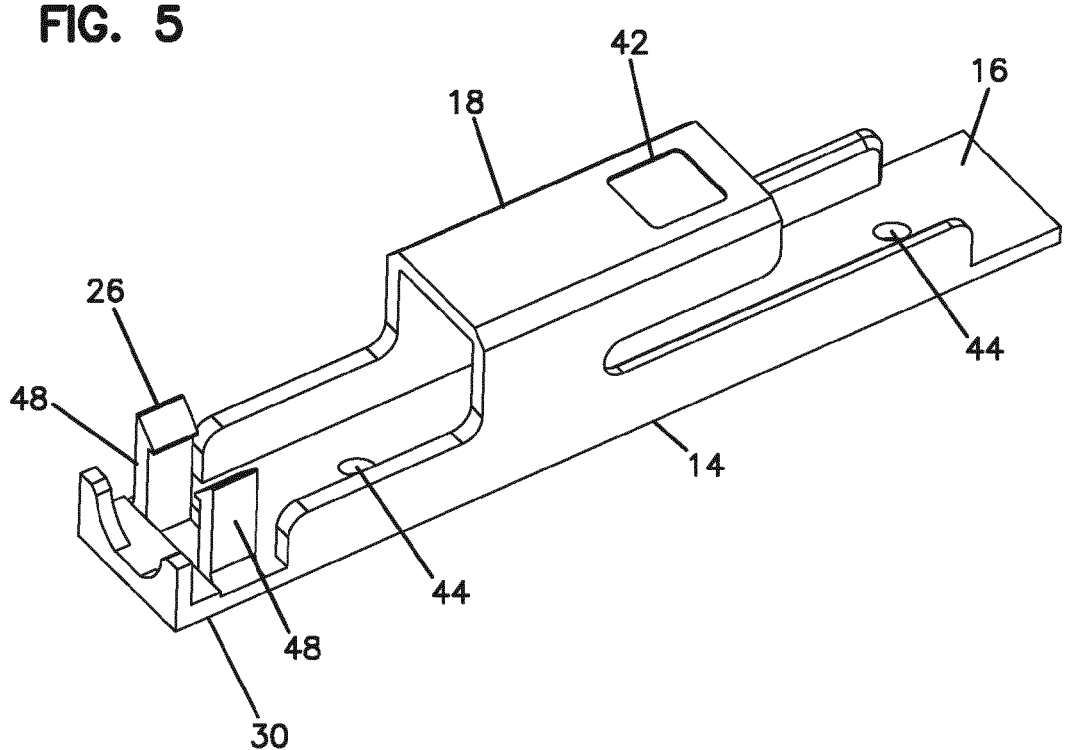
FIG. 5 is a perspective view of the fiber optic connector holder.
Figure 6:
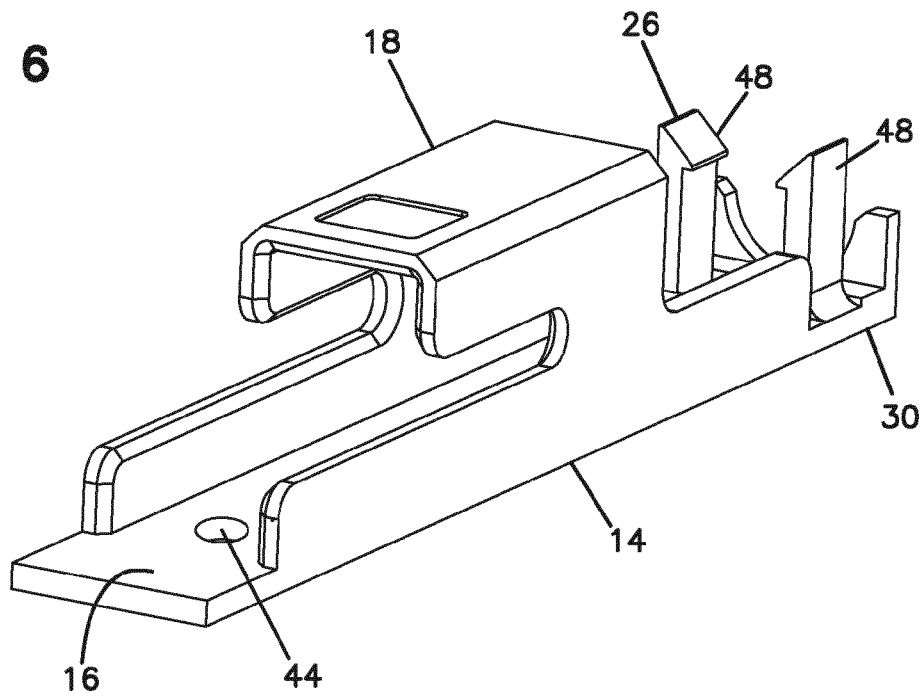
FIG. 6 is another perspective view of the fiber optic connector holder.
Figure 7:
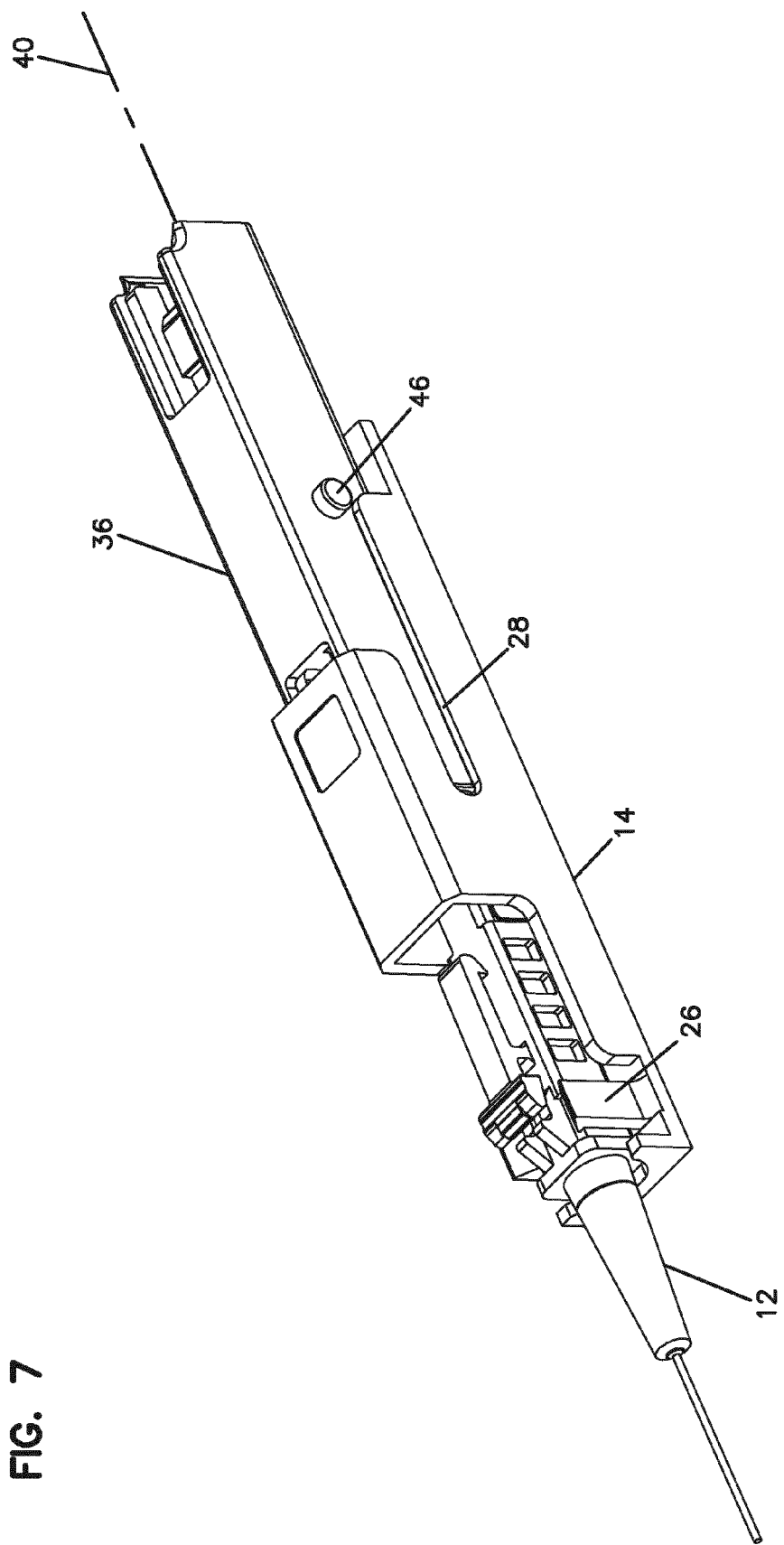
FIG. 7 shows a fiber optic adapter being mounted to the fiber optic connector held by the fiber optic connector holder of FIG. 1.
Figure 8:
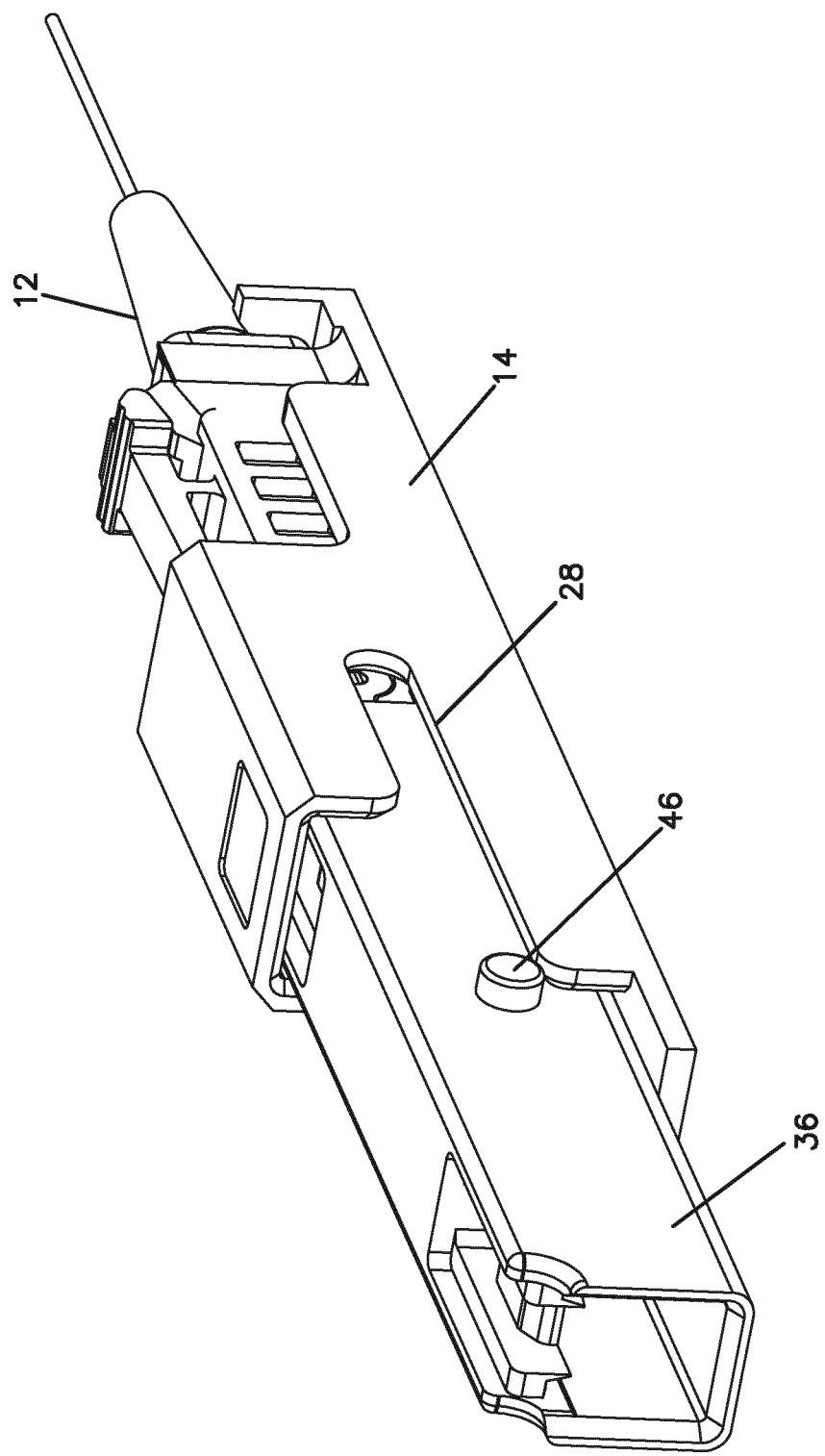
FIG. 8 is a further view of the fiber optic adapter being mounted to the fiber optic connector.
Figure 9:
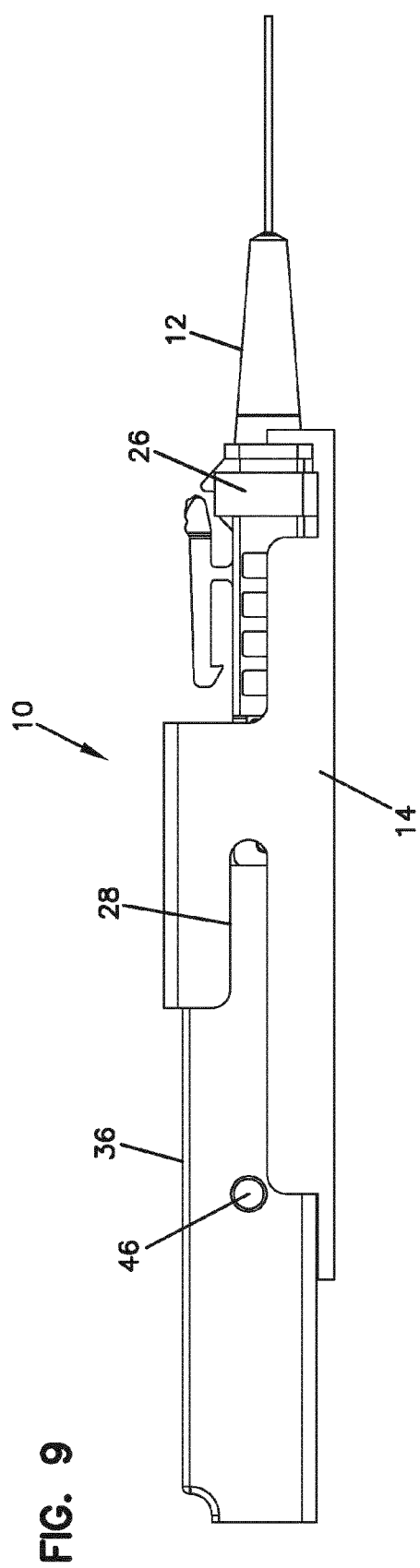
FIG. 9 is a side view of the fiber optic adapter being mounted to the fiber optic connector.
Figure 10:
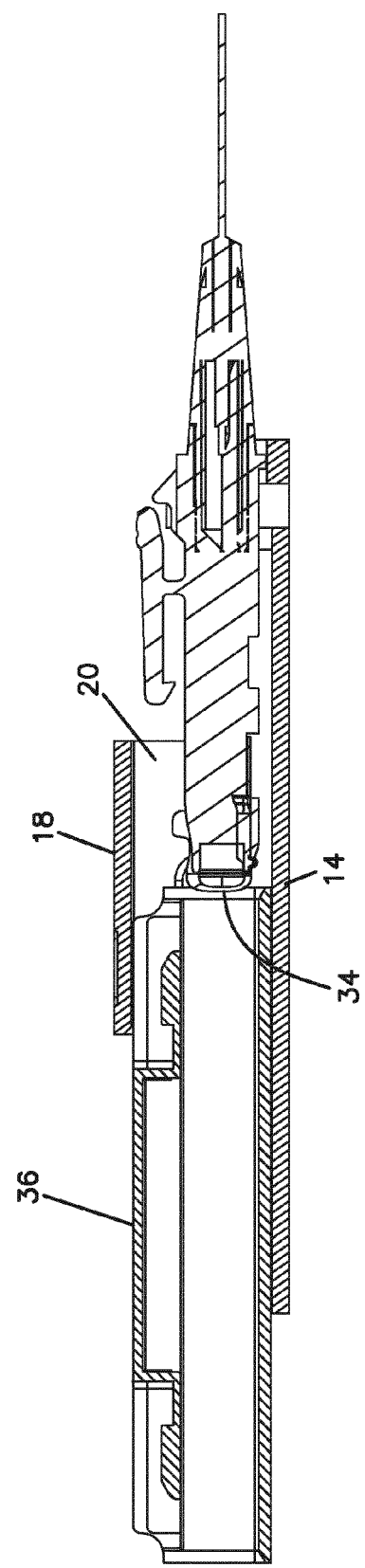
FIG. 10 is a cross-sectional side view of the view of FIG. 9.
Figure 11:
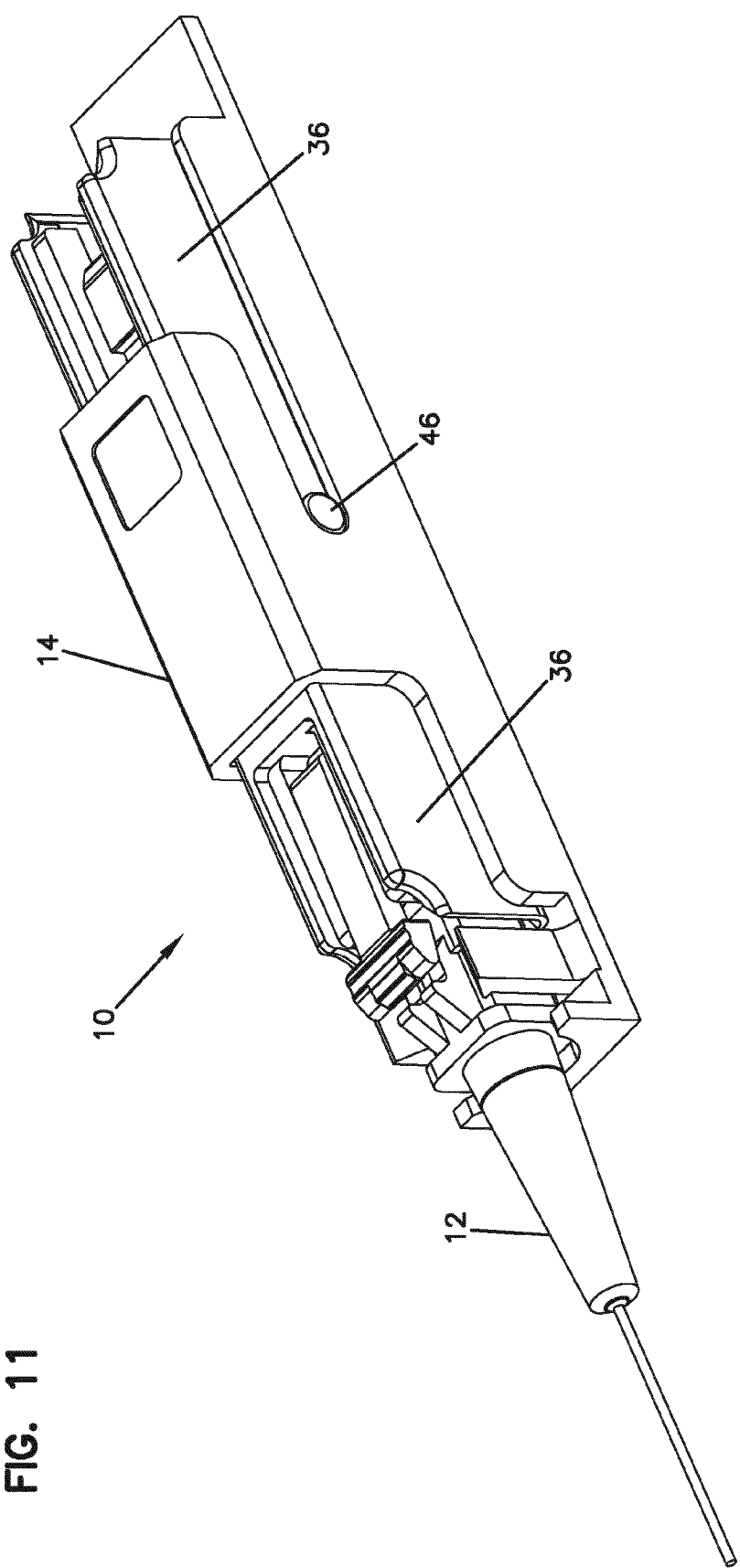
FIG. 11 is a perspective view of the fiber optic adapter fully mounted to the fiber optic connector.
Figure 12:
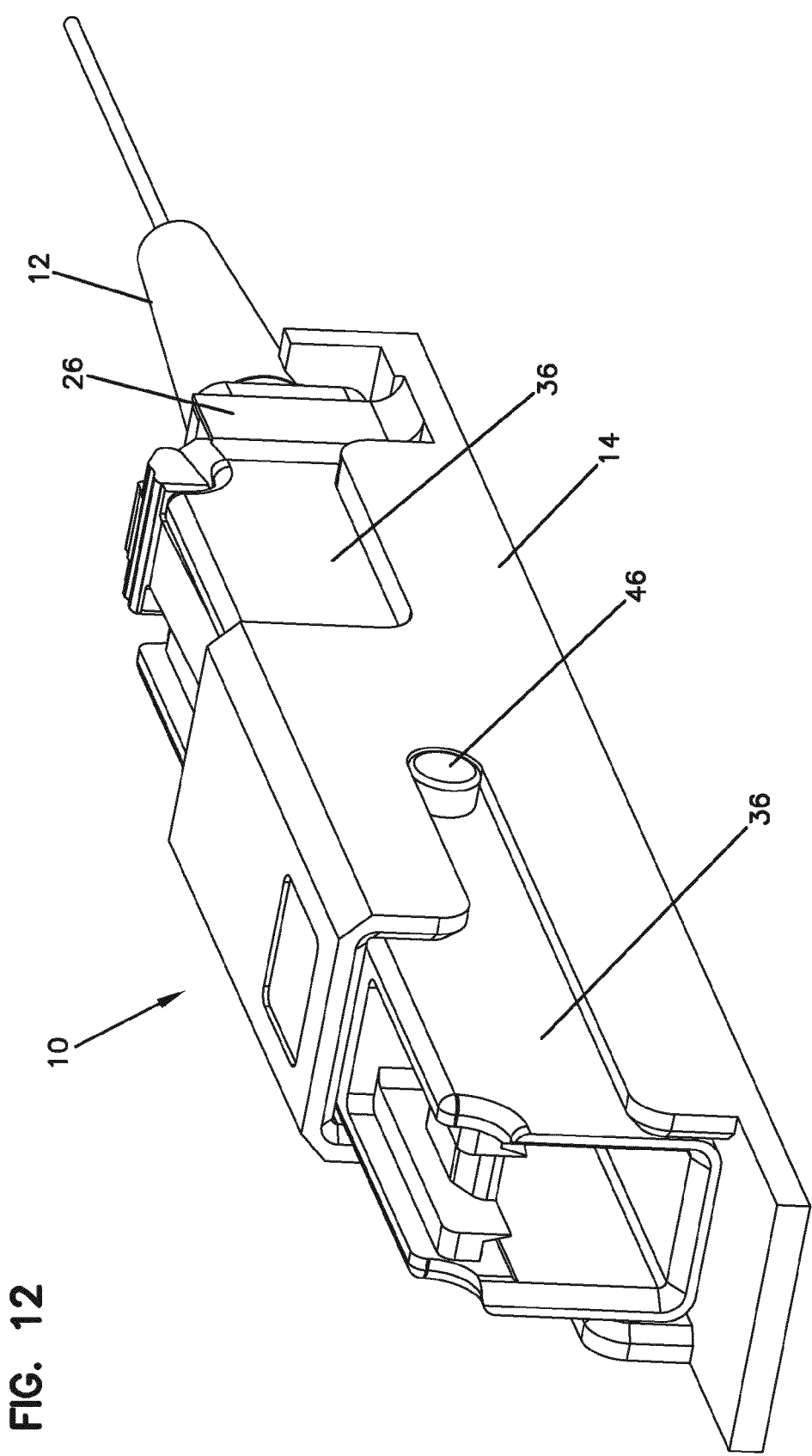
FIG. 12 is a further perspective view of the fiber optic adapter mounted to the fiber optic connector.
Figure 13:
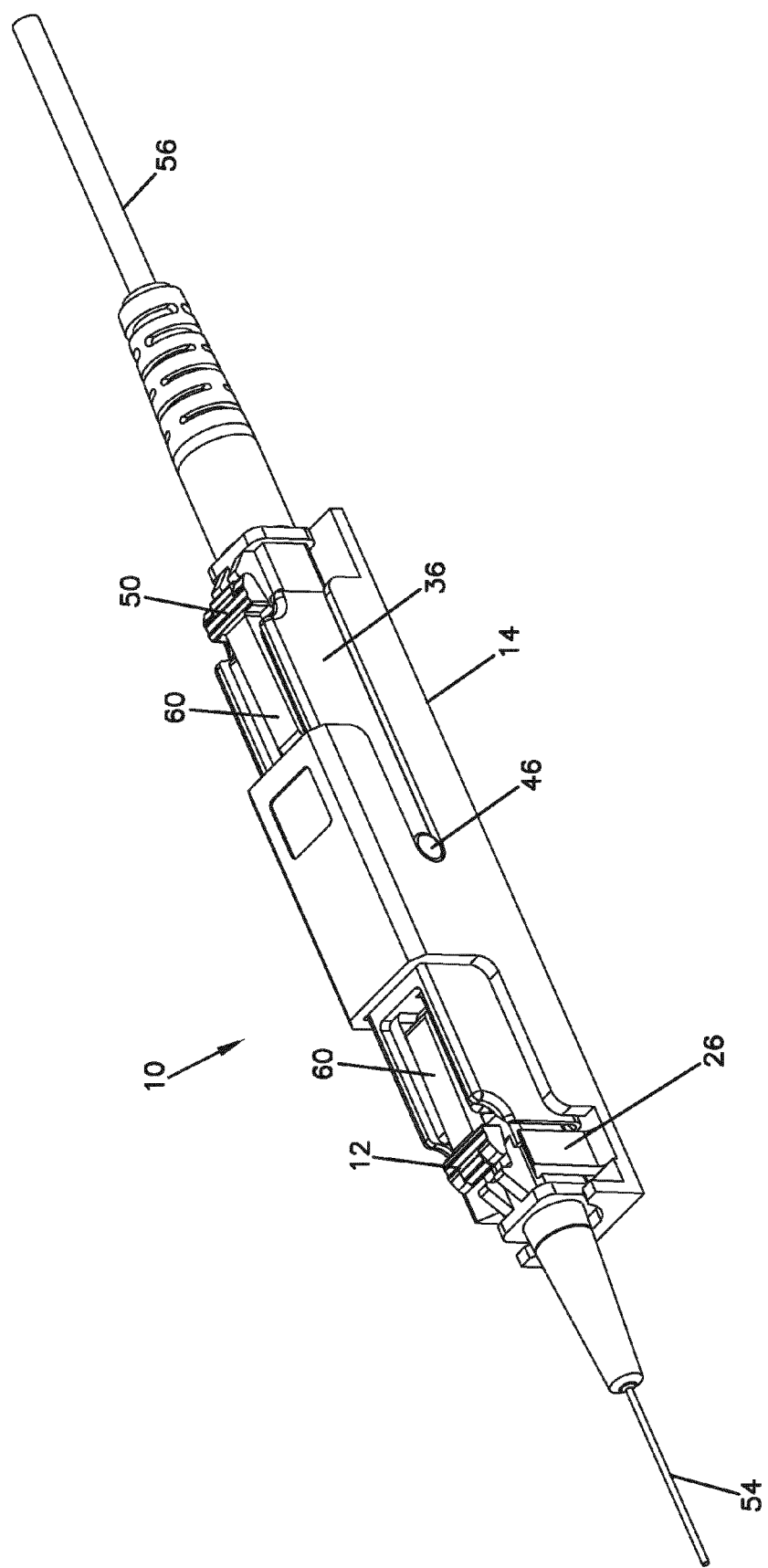
FIG. 13 is a perspective view showing a second fiber optic connector mounted to the fiber optic adapter for optical signal transmission between two fiber optic cables.
Figure 14:
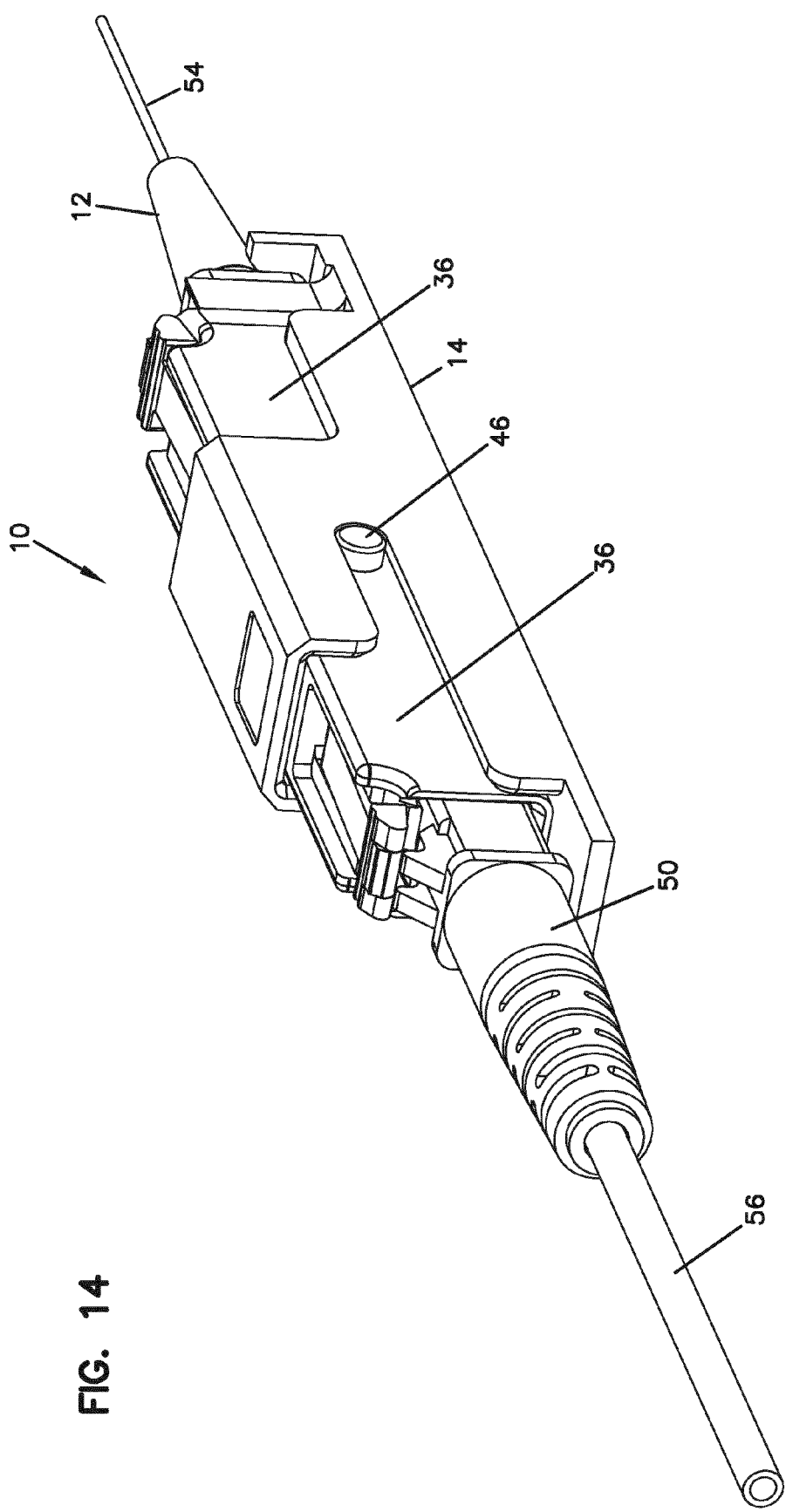
FIG. 14 is a further perspective view of the view of FIG. 13.

Referring now to FIGS. 1-6, a connector holder system 10 is shown. System 10 includes a fiber optic connector holder 14 which holds a first fiber optic connector 12. System 10 maintains first connector 12 in a protected and organized manner for later connection to a second fiber optic connector. System 10 also does not require a fiber optic adapter for holding the first connector 12 before connection to the second connector. With system 10, a connector only approach is provided wherein only the one or more first connectors 12 are held and maintained ready for connection to an adapter and one or more second connector as desired by the user.

Holder 14 includes a base 16 and a housing 18. Housing 18 defines a pocket 20 for receipt of a distal end 22 of first connector 12. Pocket 20 also receives an adapter as will be described below. Holder 14 includes a clip 26 which clips to first connector 12 to hold first connector 12 to holder 14. As shown, clip 26 clips to a rear 24 of first connector 12. Clip 26 is located at end 30 of holder 14. Clip 26 is u-shaped and includes two clip arms 48.

As shown in FIGS. 7-12, an adapter 36 is inserted into an opposite end 32 of holder 14 for mating connection with first connector 12. Adapter 36 is inserted along a longitudinal axis 40 into pocket 20 and latches to first connector 12. Adapter 36 is not latched to holder 14 wherein movement in the axially direction would be prevented. Instead, axial movement is controlled by clip 26 mounted to first connector 12.

Adapter 36 includes posts 46 which slide along slots 28 of holder 14 to provide proper alignment with first connector 12. Pocket 20 does provide some support to adapter 36. The main fixation of the mating connectors and adapter is between first connector 12 and holder 14.

Once adapter 36 is mated with first connector 12, a second connector 50 is mated with adapter 36. See FIGS. 13-16. Once second connector 50 is mated with adapter 36, fiber optic signals can be transmitted between a first cable 54 and a second cable 56. Once both connectors are mated to adapter 36, the fiber optical fibers within each of the first and second connectors 12, 50 and cables 54, 56 are in optical alignment.

If desired, second connector 50 can be pre-mated with adapter 36, and then the combined adapter 36 and second connector 50 can be inserted into holder 14 for mating with first connector 12.

First connector 12 includes a shutter 34 for protecting the user and others before connection to the second connector 50. Second connector 50 also preferably includes a shutter.

Holder 14 includes an RFID tag location 42 for holding an RFID tag, if desired. Holder 14 can be provided with holes 44 (see FIGS. 5 and 6) to allow for RFID tags on the connectors to be read while positioned in holder 14. RFID tags allow for identification of specific connectors and adapters.

Holder 14 is shown with a closed housing 18 defining pocket 20. Housing 18 is optional if desired. An open topped base 16 can be provided.

Holder 14 can be used as a system demarcation location. In some implementations, first connectors 12 cannot be removed, if desired. Only adapters 36 and second connectors 50 would be accessible in that case.

Figure 17:
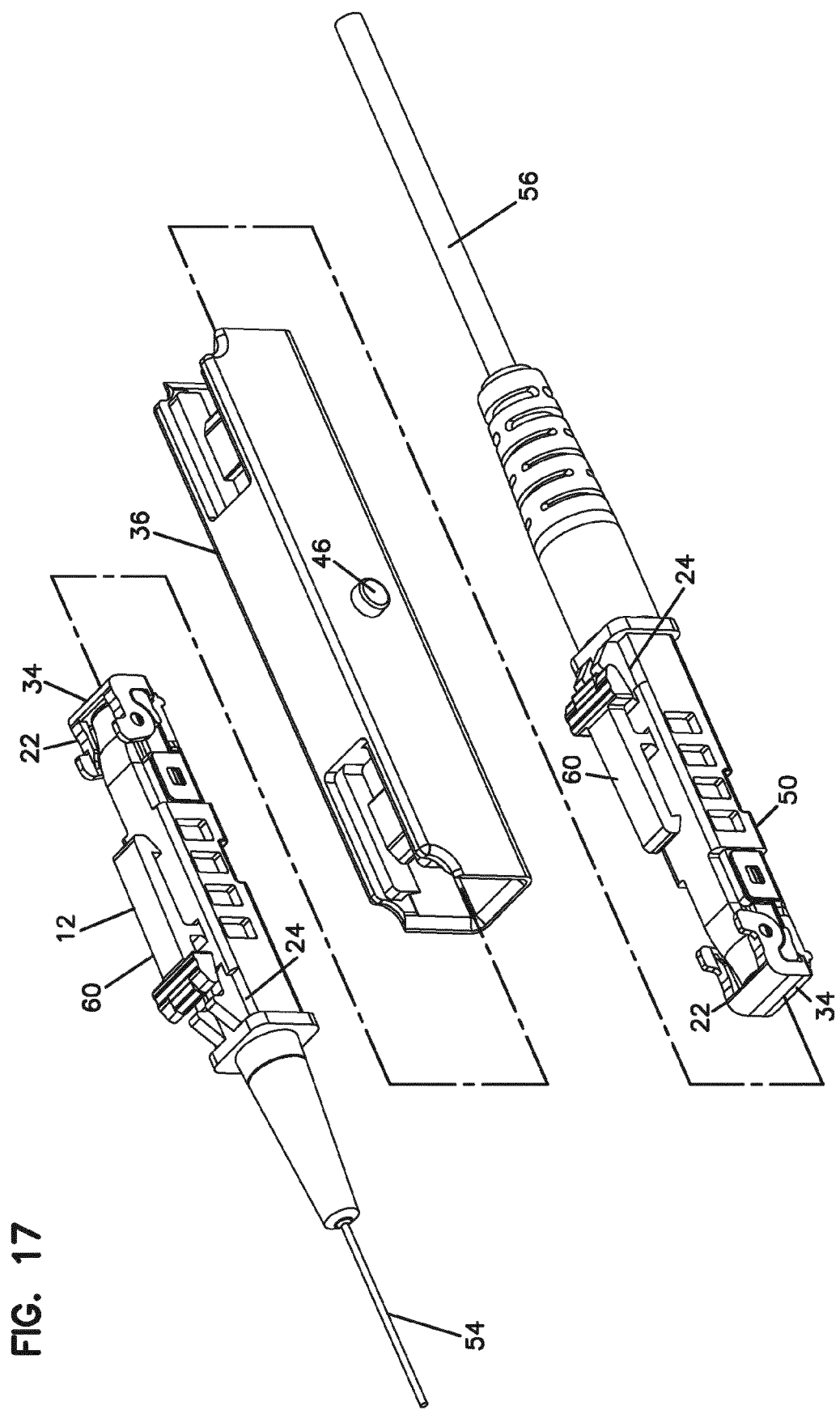
FIG. 17 is an exploded perspective view showing two fiber optic connectors separated from a mating fiber optic adapter.

Referring now to FIG. 17, adapter 36 is shown separated from first connector 12 and second connector 50. In use, connectors 12, 50 mount to adapter 36 with latches 60. During insertion of connectors 12, 50 into adapter 36, shutters 34 lift up exposing the optical fiber inside of connectors 12, 50. Further descriptions of the functions and structures of first connector 12 and second connector 50 and the mating adapter 36 are shown in U.S. Patent Application Ser. No. 61/758,021, entitled Optical Fiber Connection System Including Optical Fiber Alignment Device, filed Jan. 29, 2013, and WO 2013/117598, Published Aug. 15, 2013, the disclosures of which are incorporated by reference. The first and second connectors 12, 50 and mating adapter 36 are shown in the drawings as one example implementation. It is to be appreciated that other connectors and adapters could be used as desired wherein the connector (for example, LC, SC, MPO) is mounted to a holder configured to mount to the connector, instead of the adapter.

Figure 18:
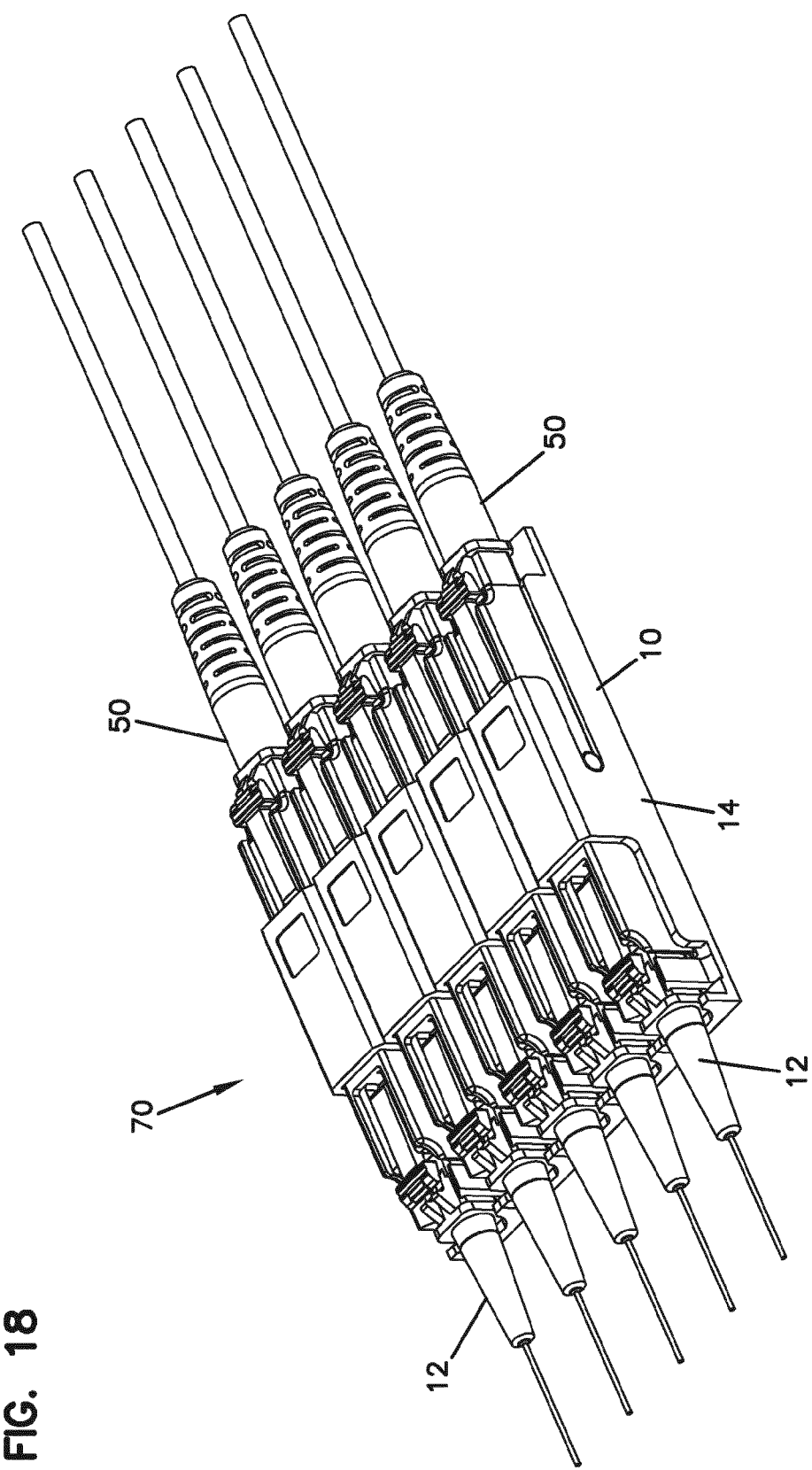
FIG. 18 shows a plurality of fiber optic connector holders mounted in a mounting arrangement for holding a plurality of first fiber optic connectors, mating fiber optic adapters, and second fiber optic connectors.
Figure 19:
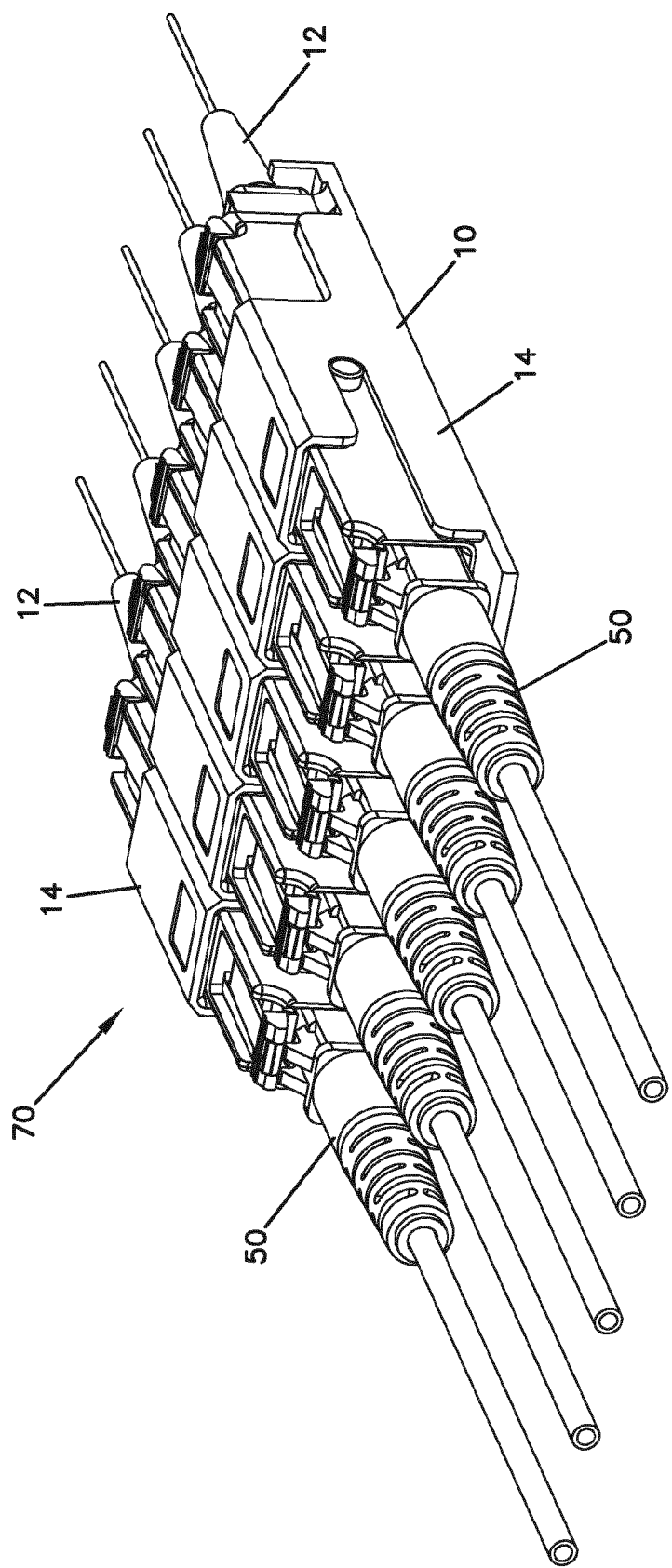
FIG. 19 is a further perspective view of the fiber optic connector holder mounting arrangement of FIG. 18.
Figure 20:
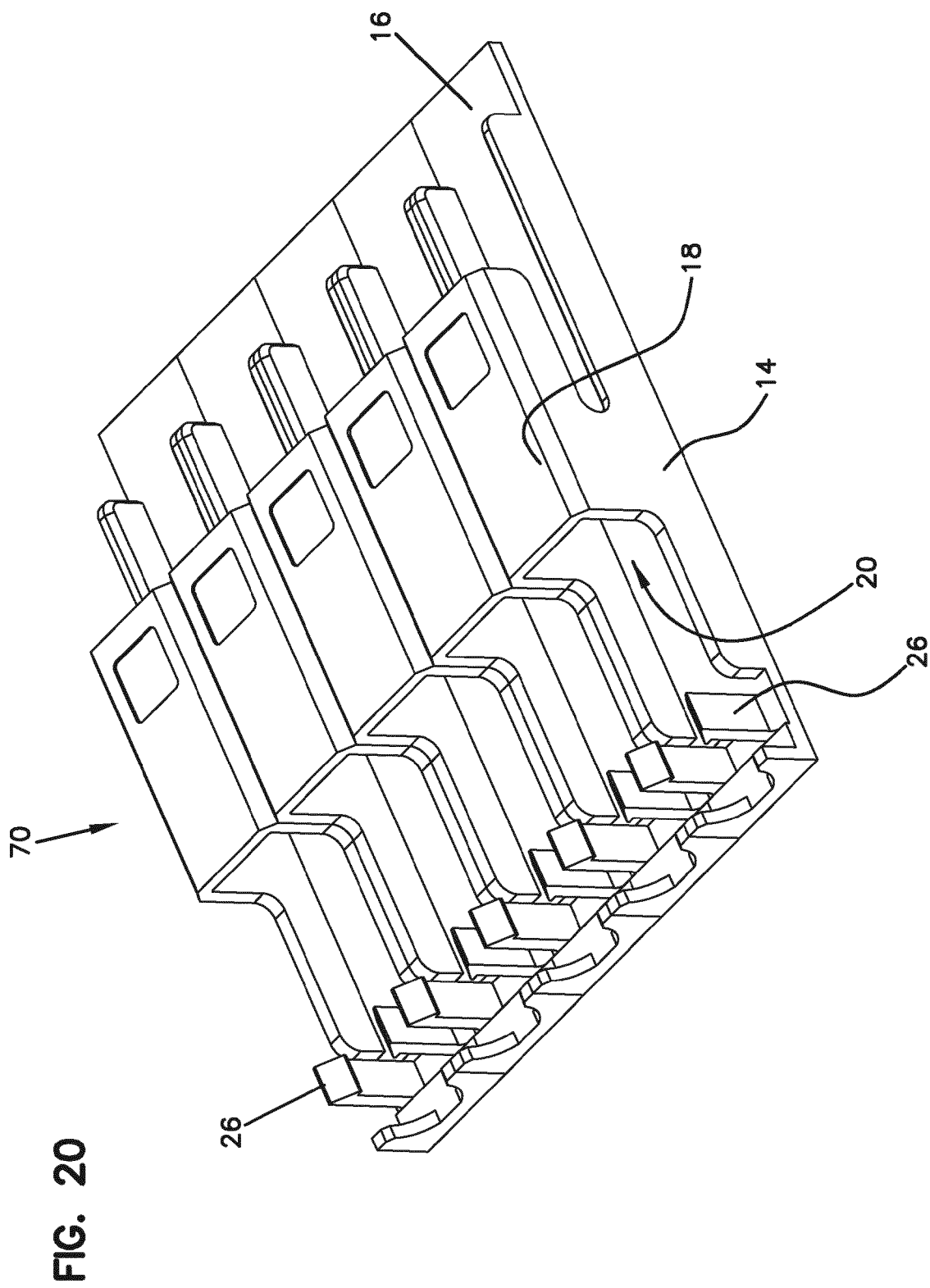
FIG. 20 is a perspective view of the fiber optic connector holder mounting arrangement without the connectors or adapters shown.

Referring now to FIGS. 18-20, a mounting arrangement 70 is shown with a plurality of holders 14. Holders 14 can be separate elements held together with a mounting structure, or mounting arrangement 70 can be made with integrally formed holders 14.

A single holder 14 or a plurality of holders 14, such as mounting arrangement 70, can be mounted to a tray, a panel, a module, a cassette, a chassis, or other telecommunications equipment, as desired. In the example implementation, clip 26 is releasable for removing first connector 12. Other mounting structures can be used instead of clip 26 to mount first connector 12 to holder 14.

FIGS. 21-24 show various implementations of mounting arrangements 70 including a plurality of holders 14, either separately mounted, or integrally formed therewith for holding a plurality of connectors prior to connections with an adapter and a second connector. The mounting arrangements 70 can be movably mounted for improved user access too, as desired.

Figure 21:
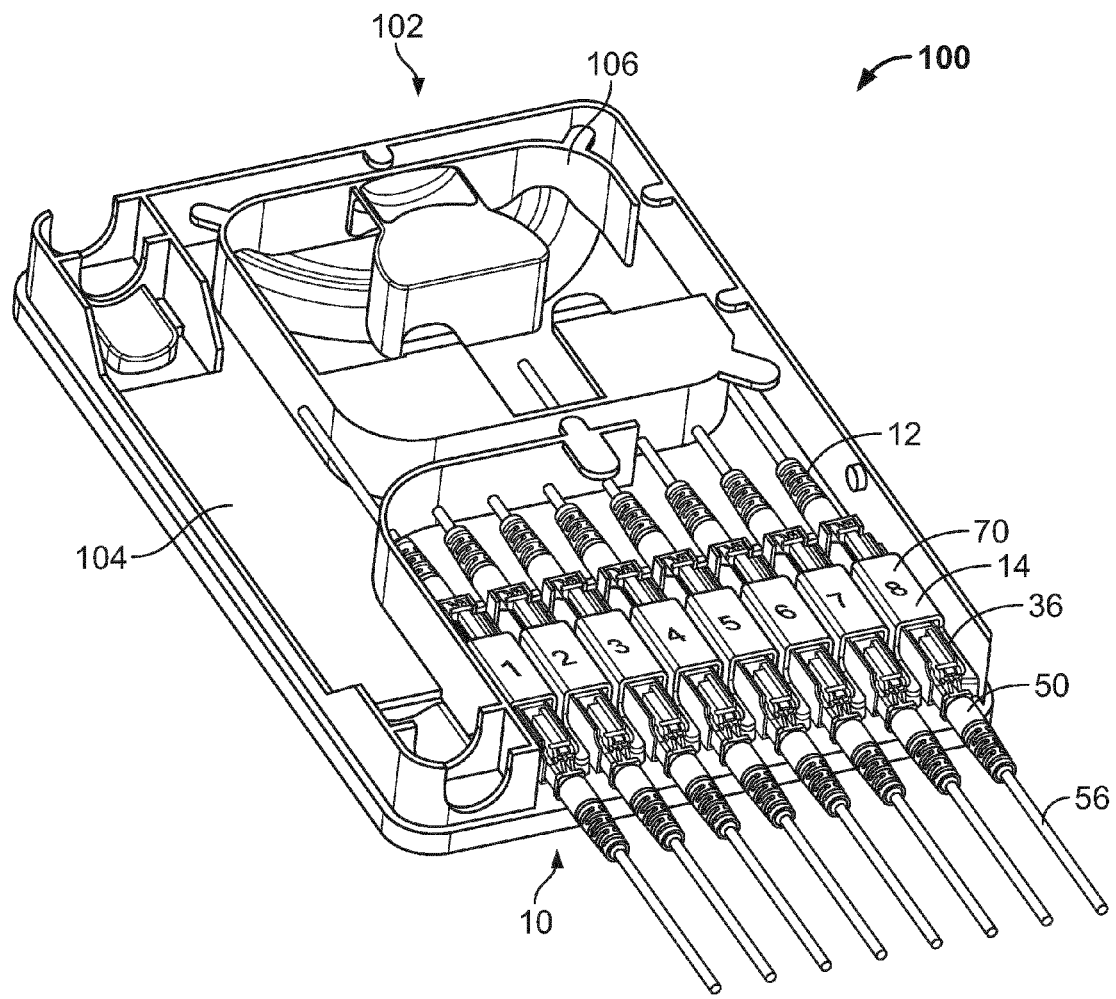
FIG. 21 is an example implementation of a connector holder system utilizing the connector holder implementations of FIGS. 1-20.

Referring now to FIG. 21, a first tray 100 is shown including a mounting arrangement 70 in the form of a single row of fiber optic connector holders 14. First tray 100 can include other cable management structures 102 such as a cable pass through 104 and a cable storage area 106.

Figure 22:
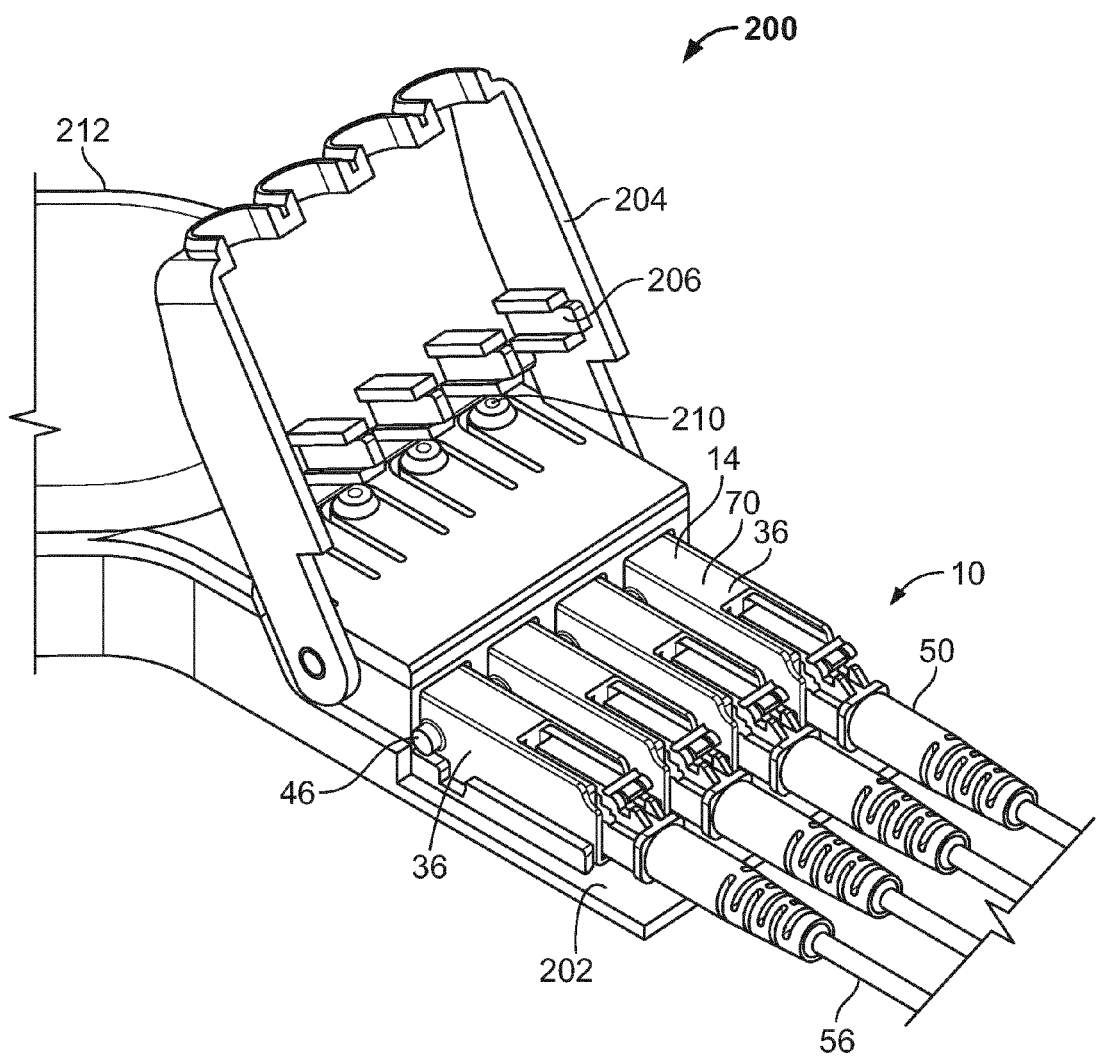
FIG. 22 is another example implementation of a connector holder system utilizing the connector holder implementations of FIGS. 1-20.

Referring now to FIG. 22, a second tray 200 is shown with a mounting arrangement 70 in the form of a single row of fiber optic connector holders 14. Second tray 200 includes a tray base 202 and a pivotable cover 204. Posts 46 on adapters 36 are held in slots 206 when cover 204 is closed. Fixation is by the first connectors 12 (not shown) within the interior second tray 200. Slots 206 provide an additional load bearing structure in situations where an extra load may be placed on second connectors 50 and cables 56. However, the engagement of posts 46 and slots 206 does not interfere with the fiber optic signal pathway alignment between the first and second connectors 12, 50, since the primary fixation is by tray 200, holders 14 and first connectors 12 inside of tray 200. Posts 46 allow for rotation of adapter 36 to help avoid stress on the fiber to fiber alignment. Adapters 36 can be removed from the interiorly located first connectors 12 by engagement with buttons 210. Button 210 engages the connector latch 60 on first connector 12 disposed within the closed interior of a rear portion 212 of second tray 200.

Figure 23:
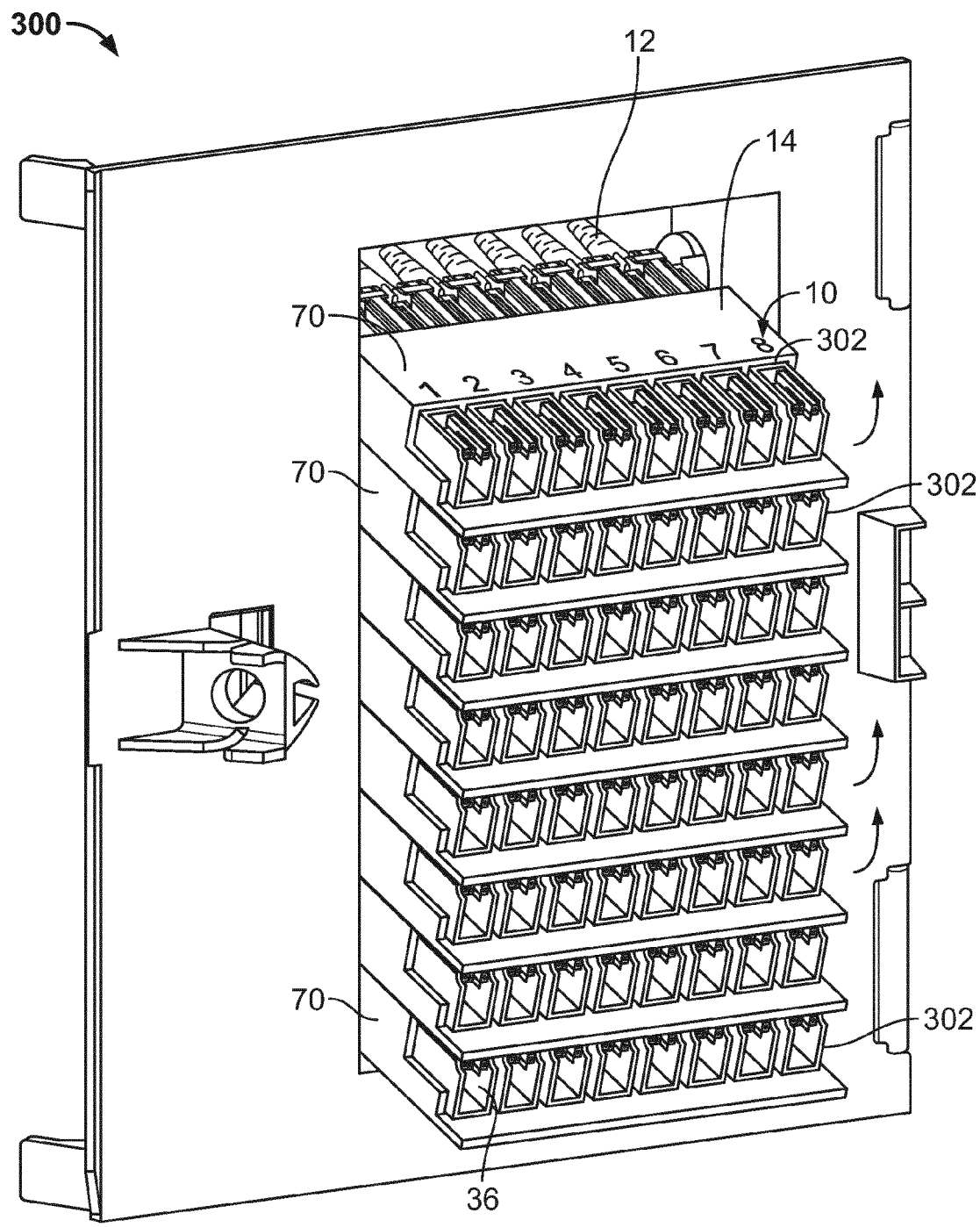
FIG. 23 is a further example implementation of a connector holder system utilizing the connector holder implementations of FIGS. 1-20.

Referring now to FIG. 23, a panel 300 is shown including a plurality of rows 302 of holders 14. Holders 14 are provided in mounting arrangements 70 which are pivotable up and down relative to one another to allow for connector access. Such pivoting will also allow for improved access to individual RFID tags associated with the adapters 36, and the related connectors 12, 50.

Figure 24:
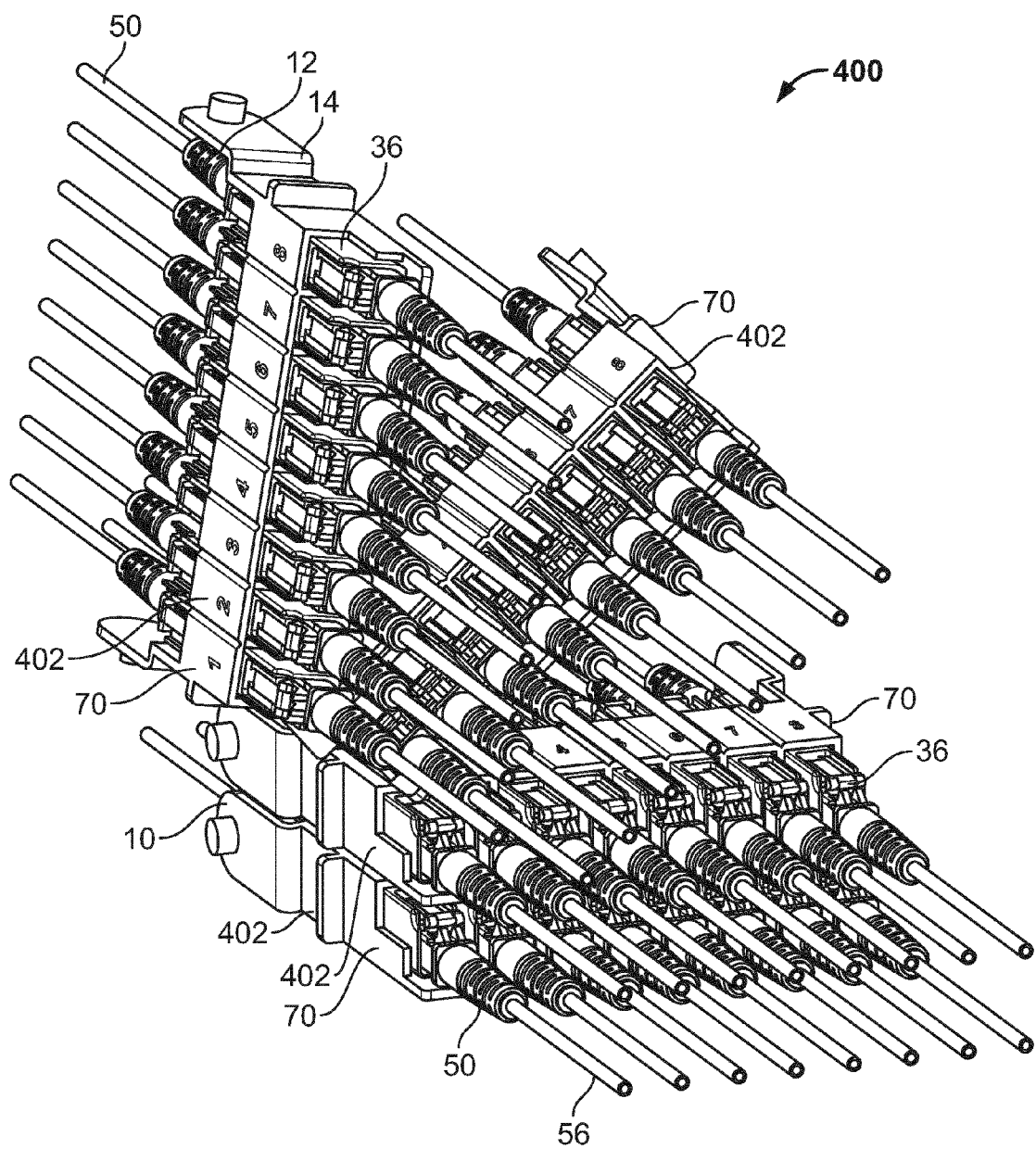
FIG. 24 is a further example implementation of a connector holder system utilizing the connector holder implementations of FIGS. 1-20.

Referring now to FIG. 24, a mounting block 400 is shown with a plurality of rows 402 of holders 14. As with panel 300, mounting block 400 also includes a dense arrangement of the adapters 36 and the first and second connectors 12, 50 in mounting arrangement 70. Rows 402 pivot about an axis which is parallel to the connector axis for each of the connectors for improved access to the adapters 36 and connectors 12, 50.

Connector holder system 10 and the various implementations noted above holds the connector of one of the mated connector pairs, instead of the mating adapter 36. In general, it is not desirable to precisely fix to a holder, tray, or other device both of the mating connectors and the mating adapter. Tolerance offsets, and misalignments may interfere with proper fiber alignment and signal transmission. In the present implementations, the connector 12 is the primary fixation of the system 10. If there is additional fixation provided, such as for load bearing situations, it does not interfere with the connector 12 to holder 14 fixation, or the fiber to fiber alignment.

One result of providing a connector holder system 10 as described herein is that the adapters 36 can be added at a later date, when desired. In the implementations shown above, the connector 12 is protected without the need for an adapter.

The above specification, examples and data provide a complete description of the manufacture and use of the composition of the invention. Since many embodiments of the invention can be made without departing from the spirit and scope of the invention, the invention resides in the claims hereinafter appended.

10 Connector holder system
12 First fiber optic connector
14 Fiber optic connector holder
16 Base
18 Housing
20 Pocket
22 Distal end of first connector 24 Rear of first connector
26 Clip
28 Slots
30 End of holder
32 Opposite end of holder
34 Shutter
36 Adapter
40 Longitudinal axis
42 RFID tag location
44 Holes
46 Posts
48 Clip arms
50 Second fiber optic connector
54 First cable
56 Second cable
60 Latch
70 Mounting arrangement
100 First tray
102 Structures
104 Cable pass through
106 Cable storage area
200 Second tray
202 Base
204 Cover
206 Slots
210 Buttons
212 Rear Portion
300 Panel
302 Rows
400 Mounting block
402 Rows

The invention claimed is:

1. A fiber optic connection system comprising:
a first fiber optic connector;
a holder including a base and a housing, the housing of the holder defining a pocket for receiving the first fiber optic connector, wherein the holder is capable of receiving a fiber optic adapter for mating with the first fiber optic connector, the fiber optic adapter matable with a second fiber optic connector; and
a clip arrangement comprising a first arm and a second arm, the first arm extending upwardly from the base of the holder at a first location, and the second arm extending upwardly from the base of the holder at an opposite second location, the first and second arms securing the first fiber optic connector to the holder.

2. The system of claim 1, wherein the clip is releasable for releasable connection to the first connector.

3. The system of claim 1, wherein the holder includes adapter engagement features.

4. The system of claim 1, further comprising a plurality of first connectors, and a plurality of holders.

5. The system of claim 4, wherein the plurality of holders are arranged in at least one row.

6. The system of claim 5, wherein the plurality of holders are arranged in a plurality of rows.

7. The system of claim 1, further comprising a release mechanism for releasing a connector latch from the adapter.

8. The system of claim 1, wherein the first and second arms of the clip arrangement and the base of the holder are in a generally U-shaped configuration.

9. A method of using a connector comprising:
providing a first fiber optic connector;
providing a holder including a base and a housing, the housing of the holder defining a pocket for receiving the first fiber optic connector;
mounting the first fiber optic connector within the pocket of the holder;
securing the first fiber optic connector to the holder with a clip arrangement, the clip arrangement comprising a first arm and a second arm, the first arm extending upwardly from the base of the holder at a first location, and the second arm extending upwardly from the base of the holder at an opposite second location;
wherein the holder is capable of receiving a mating fiber optic adapter and a second fiber optic connector matable with the fiber optic adapter at a later time.

10. The method of claim 9, further comprising mounting a fiber optic adapter to the first fiber optic connector while the first fiber optic connector is mounted to the holder.

11. The method of claim 10, further comprising mounting a second fiber optic connector to the fiber optic adapter.

12. The method of claim 11, wherein the second fiber optic connector is mounted to the fiber optic adapter before the fiber optic adapter is mounted to the first fiber optic connector.

13. The method of claim 11, wherein the second fiber optic connector is mounted to the fiber optic adapter after the fiber optic adapter is mounted to the first fiber optic connector.

14. The method of claim 9, wherein a plurality of first fiber optic connectors are provided mounted to one or more holders.

15. The method of any of claim 9, further comprising a release mechanism for releasing a connector latch from the adapter.

16. The system of claim 9, wherein the first and second arms of the clip arrangement and the base of the holder are in a generally U-shaped configuration.

* * * * *